United States Patent [19]

Mikesell

[11] Patent Number: 4,496,836
[45] Date of Patent: Jan. 29, 1985

[54] DEVICE FOR IDENTIFYING A CIRCUMFERENTIAL POSITION

[75] Inventor: Charles R. Mikesell, Idaho Falls, Id.

[73] Assignee: The United States of America as represented by the United States Department of Energy, Washington, D.C.

[21] Appl. No.: 393,285

[22] Filed: Jun. 29, 1982

[51] Int. Cl.³ .............................................. G01D 5/34
[52] U.S. Cl. .................................... 250/231 R; 33/366
[58] Field of Search ................... 250/231 R, 239, 221, 250/200, 231 SE; 33/283, 365, 366

[56] References Cited

U.S. PATENT DOCUMENTS

| 2,109,054 | 2/1938 | Soreng et al. | 200/312 |
| 2,826,823 | 3/1958 | Hagner | 33/365 |
| 2,859,725 | 11/1958 | Genasci | 33/391 |
| 3,548,508 | 12/1970 | Jacobsen | 33/365 |
| 3,611,345 | 10/1971 | Pintell | |
| 3,774,314 | 11/1973 | Youngs | 33/365 |
| 3,813,556 | 5/1978 | Beer et al. | 250/231 R |
| 3,863,067 | 1/1975 | Gooley | 250/231 R |
| 3,923,000 | 12/1975 | Cloyd | 33/365 |
| 3,967,135 | 6/1976 | Balban et al. | 250/231 R |
| 4,110,609 | 8/1974 | Beer | 250/231 R |

Primary Examiner—David C. Nelms
Assistant Examiner—J. Brophy
Attorney, Agent, or Firm—Sandra B. Weiss; John M. Albrecht

[57] ABSTRACT

A device is described which accurately and reproducibly identifies points on the circumference of a non-vertical pipe for use as reference marks for pipe inspections. The device comprises a light-permeable disk-shaped chamber having a plurality of pockets spaced about its circumference, a light source transmitting a beam of light through the chamber, and a light-activated switch positioned to detect the light beam. The chamber contains a freely moving ball sized to be retained by the pockets. The device is mounted to revolve about the axis of the pipe. As it revolves the ball moves from one pocket of the chamber to another, interrupting the beam of light and triggering the light-activated switch, thereby indicating that the device has passed to a pre-selected circumferential position on the non-vertical pipe.

7 Claims, 2 Drawing Figures 4,496,836

1

DEVICE FOR IDENTIFYING A CIRCUMFERENTIAL POSITION

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to a device for identifying a circumferential position on a non-vertical pipe. More particularly, the invention relates to a device for accurately and reproducibly identifying a particular point on the circumference of a non-vertical pipe for use as a reference mark for pipe inspections.

Various types of mechanical equipment may be designed to revolve about a non-vertical pipe. A typical example is an optical scanner used to examine pipes and pipe welds for structural integrity. Such scanners are useful in environments such as chemical process plants or nuclear reactors, where the structural integrity of pipes and pipe welds must be monitored periodically and reproducibly.

Such revolving scanners have been developed. One problem associated with these devices is that the operator must be able to accurately determine the circumferential position of the scanner in order to relate the optical data generated to the proper physical location on the pipe. In particular, it would be desirable to accurately identify a single point as a reference mark to ensure reproducibility during subsequent service inspections. Ideally, such identification should not require a physical mark or change on the surface of the pipe being inspected.

SUMMARY OF THE INVENTION

It is thus one object of the invention to provide a device for identifying a circumferential position on a non-vertical pipe.

It is another object of the invention to provide a device for accurately and reproducibly identifying a particular point of a pipe circumference for use as a reference mark.

Additional objects, advantages, and novel features of the invention will be set forth in part in the following description.

The inventive device comprises a light source, a light-activated switch, and a light-permeable chamber therebetween. The chamber is generally disk-shaped in cross-section through its axis with pockets spaced about its circumference, and contains an object such as a ball which can move freely from one pocket to another within the chamber as set forth herein. The device is mounted to revolve around a non-vertical pipe, such that the axis of the chamber is parallel to the axis of the pipe. As the device circumferentially progresses on the pipe, the ball falls from one pocket to the next. Each time the ball falls from one pocket to the next pocket in the chamber, it interrupts a beam of light passing from the light source through the chamber to the light-activated switch. The switch then sends a signal to a computer indicating that the device has progressed to a new circumferential position, that is to say, the device has "triggered". If the chamber is provided with four pockets spaced equidistantly about its circumference, the device will give a signal each time it passes from one quadrant of the pipe circumference to another. Identification of the particular quadrant may be accomplished with concurrent visual observation of the revolving device.

The device provides a reliable and reproducible means of identifying one or more circumferential positions. The device may be mounted to trigger at the top-dead-center of the pipe or it may be oriented to trigger at any other position required. For example, in some cases intersecting pipes or other obstructions may block the top-dead-center or sides of the pipe. Then other unobstructed areas on the pipe circumference may be used to identify reference points by appropriate orientation of the inventive device.

DETAILED DESCRIPTION OF THE PREFERRED EMBODIMENT

The following is a detailed description of a preferred embodiment; other embodiments will be readily apparent to those skilled in the art.

Figure 1:
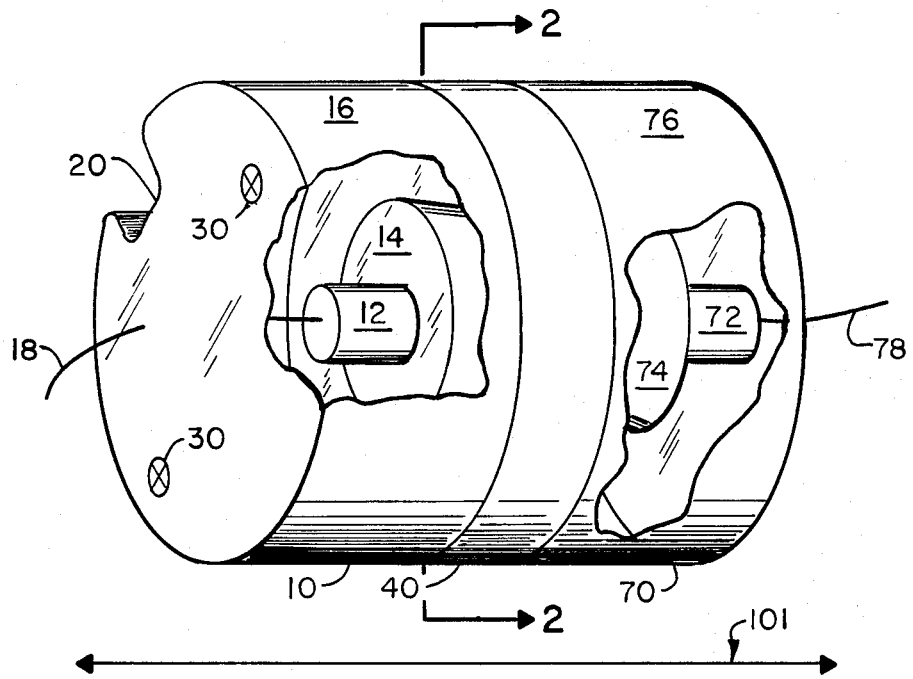
FIG. 1 is a perspective view of the assembled device, partially cut away to show the light source and light-activated switch.

FIG. 1 is a perspective view of the assembled device, partially cut away to show the interior structure. The device comprises three components 10, 40, and 70. Component 10 comprises a light source such as a light-emitting diode (LED) 12 set in tapered steel washer 14, held together with molded elastomer 16. The electrical leads 18 of LED 12 emerge from elastomer 16. The LED 12 is oriented to provide a beam of light passing through component 40 to component 70.

Component 40 comprises a molded elastomer having an open interior, as will be described in detail.

Component 70 comprises a light-activated switch 72 aligned to receive the beam of light emanating from LED 12. Switch 72 is set in tapered steel washer 74, and switch 72 and washer 74 are secured by molded elastomer 76. Electrical leads 78 of switch 72 emerge from elastomer 76.

A channel 20 runs the entire length of the assembled device. If necessary, electrical leads 18 and 78 may be fitted into channel 20 when the device is installed.

Figure 2:
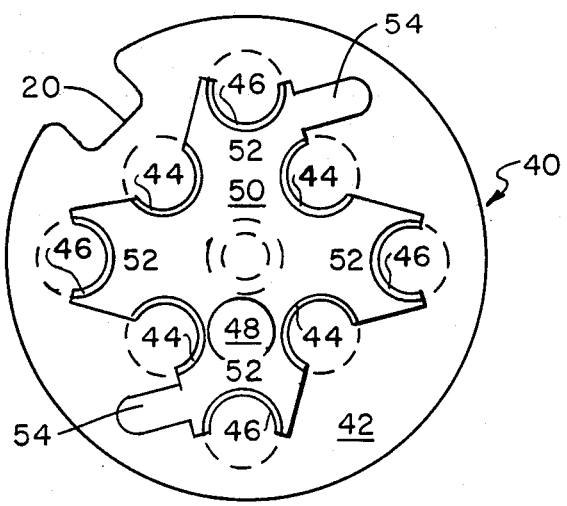
FIG. 2 is a cross-section view of the chamber taken along line 2—2 of FIG. 1

FIG. 2 shows a cross-sectional view of component 40 taken along line 2—2 of FIG. 1. Molded elastomer 42 is shaped to retain eight steel balls, the balls being positioned to partially extend into the open interior 50 of molded elastomer 42. Four of the balls, 44, are positioned relatively close to and equidistant from the center of the interior 50, and are oriented at 90° with respect to each other. The other four balls 46 are equidistant from the center, farther from the center than balls 44, and are oriented at 90° with respect to each other and 45° with respect to the adjacent balls 44. Any two adjacent balls 44 and the ball 46 between them form a pocket 52, such that four pockets 52 are formed at 90° with respect to each other.

When the three components 10, 40 and 70, are assembled as shown in FIG. 1, the interior surfaces of components 10 and 70 serve as chamber walls for the interior 50 of component 40. Within said chamber is a stainless steel ball 48 which moves freely therein and which is sized to be retained by said pockets 52. The inventive device is mounted to revolve about a pipe parallel to axis 101 shown in FIG. 1. As the device revolves to a trigger position, steel ball 48 drops from one pocket 52 to the next adjacent pocket. As steel ball 48 changes positions within the chamber, it necessarily travels through the center of the chamber. As it does so it interrupts the beam of light emanating from LED 12 through interior 50 to light-activated switch 72. The interruption triggers the switch 72 which sends a signal to a computer, not shown, indicating that the device has just passed a reference point. Thus a reference point may be easily and reproducibly identified. In the embodiment shown in which component 40 has four pockets 52, a reference point will be identified for each quadrant of the pipe circumference. Identification of the particular quadrant may be accomplished by concurrent visual observation of the device.

The device may be mounted in a revolving optical scanner. The reference points identified by the device may be used to correlate the optical data generated with specific physical locations on the pipe. It may be seen that the device may be oriented to trigger at the top-dead-center of the pipe, or at any other desired circumferential position of the pipe. For example, the device may be mounted with the pockets 52 aligned at any desired angle, and the device while so oriented will still trip at the desired reproducible point, which would then be unique to that particular scanner.

To reduce erroneous signals from the device due to bumping or jarring of ball 48, the interior 50 of the device may be filled with a high viscosity fluid such as a diester oil. To facilitate filling the interior 50 with a fluid, component 10 is provided with two ducts extending the full length of the component, and stoppered with plugs 30. The molded elastomer 42 of component 40 is provided with two slots 54 extending from interior 50. The slots 54 are aligned in registration with the ducts and plugs 30, such that when the device is assembled, plugs 30 may be removed to provide a means of access to interior 50. If oil is used, LED 12 and light-activated switch 72 may be an infra-red source and an infra-red activated switch.

The device can also be used to measure the circumference of the pipe. The computer can count the motor pulses between consecutive triggerings of the switch and calculate the actual diameter. A field technician then does not have to physically measure the pipe or look up the pipe size on construction drawings.

If the device were to fail, such failure would be readily detected as the switch activation would not follow the logical pattern that occurs during normal operation.

Other uses and variations will be apparent to one skilled in the art. The embodiment was chosen and described in order to best explain the principles of the invention and its practical application.

The embodiments of the invention in which an exclusive property or privilege is claimed are defined as follows:

1. A device for identifying a circumferential position on a non-vertical pipe comprising:
   a wall member defining a substantially polyhedral chamber,
   a light source external to said chamber and transmitting a beam of light therethrough,
   a light-activated switch positioned to detect said light beam transmitted through said chamber,
   an object internal to said chamber and freely moving therein subject to gravity,
   means for mounting said device to revolve about the axis of said pipe, whereby as said device revolves to a predetermined circumferential position said internal object moves within said chamber and interrupts said light beam, said interruption triggering said light-activated switch to indicate such circumferential position of said device.

2. The device of claim 1 wherein said chamber is substantially disk-shaped and has a plurality of recessed pockets equidistantly spaced about its circumference for retaining said internal object.

3. The device of claim 3 wherein the chamber has four equidistant recessed pockets, whereby said internal object will interrupt said light beam to trigger said light-activated switch as said device progresses from one quadrant of its revolution to the next.

4. The device of claim 2 wherein said light source is a light emitting diode.

5. The device of claim 2 wherein said chamber is filled with a viscous fluid.

6. The device of claim 5 wherein said light source is an infra-red source and said switch is infra-red activated.

7. The device of claim 2 wherein said internal object is a ball.

* * * * *